United States Patent
Seigler

(10) Patent No.: US 7,061,725 B2
(45) Date of Patent: Jun. 13, 2006

(54) MAGNETIC READ SENSOR WITH STRIPE WIDTH AND STRIPE HEIGHT CONTROL

(75) Inventor: Michael A. Seigler, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 245 days.

(21) Appl. No.: 10/725,882

(22) Filed: Dec. 1, 2003

(65) Prior Publication Data
US 2005/0117263 A1 Jun. 2, 2005

(51) Int. Cl.
*G11B 5/39* (2006.01)
(52) U.S. Cl. .................... 360/313; 360/322; 360/324.1
(58) Field of Classification Search ................. 360/322
See application file for complete search history.

(56) References Cited

U.S. PATENT DOCUMENTS

| | | | |
|---|---|---|---|
| 5,079,831 A | 1/1992 | Reid | 29/603.13 |
| 5,251,088 A * | 10/1993 | Coutellier et al. | 360/316 |
| 5,546,254 A | 8/1996 | Gill | 360/327.31 |
| 5,653,013 A | 8/1997 | Gill et al. | 29/603.14 |
| 5,684,568 A | 11/1997 | Ishikawa et al. | 355/68 |
| 5,783,460 A | 7/1998 | Han et al. | 438/3 |
| 6,204,071 B1 | 3/2001 | Ju et al. | 438/3 |
| 6,230,389 B1 | 5/2001 | Zhu | 29/603.1 |
| 6,230,690 B1 | 5/2001 | Umetsu | 123/509 |
| 6,310,751 B1 | 10/2001 | Guo et al. | 360/315 |
| 6,373,667 B1 | 4/2002 | Han et al. | 360/327.22 |
| 6,430,015 B1 | 8/2002 | Ju et al. | 360/327.32 |
| 6,449,131 B1 | 9/2002 | Guo et al. | 360/315 |
| 6,496,333 B1 | 12/2002 | Han et al. | 360/315 |
| 6,781,173 B1 * | 8/2004 | Tuttle et al. | 257/295 |
| 6,934,133 B1 * | 8/2005 | Hayakawa et al. | 360/324.2 |
| 2002/0135948 A1 * | 9/2002 | Funayama et al. | 360/324.1 |
| 2005/0063100 A1 * | 3/2005 | Kautzky et al. | 360/313 |

OTHER PUBLICATIONS

B. J. Van Wees, H. Van Houten, C. W.J. Beenakker, J. G. Williamson, L. P. Kouwenhoven, D. Van Der Marel and C.T. Foxon Quantized Conductance of Point Contacts in a Two-Dimensional Electron Gas Physical Review Letters, vol. 60, No. 9, Feb. 29, 1988.

Mesoscopic physics Chapter 9 9.1 Conductance quantization in quantum point contacts, no date.

* cited by examiner

*Primary Examiner*—Jefferson Evans
(74) *Attorney, Agent, or Firm*—Buchanan Ingersoll PC

(57) ABSTRACT

The present invention includes a magnetic sensing structure having a stripe height and a stripe width defining an area for a current flowing therethrough, and at least one electrode positioned adjacent an edge of the magnetic sensing structure for adjustably controlling the stripe width and/or stripe height, and therefore the area (SW×SH), of the magnetic sensing structure through which the current can flow.

32 Claims, 3 Drawing Sheets

MAGNETIC READ SENSOR WITH STRIPE WIDTH AND STRIPE HEIGHT CONTROL

FIELD OF THE INVENTION

The present invention is directed toward magnetic devices and, more particularly, toward a magnetic field sensor having adjustable stripe width and strip height control.

BACKGROUND OF THE INVENTION

The ability to increase the storage capacity of magnetic recording media is an ongoing concern. As the bit areal densities of magnetic recording media continue to progress in an effort to increase the storage capacity of hard disc drives, the physical size of the sensors and writers designed to read and write data from and to the magnetic recording media must correspondingly decrease. Accordingly, the stripe width (SW) and stripe height (SH) of the read sensors, which define the physical size of the read sensors, must decrease in order to achieve the higher areal densities. As a result of this push to increase the storage capacity of hard disc drives, read and write sensor critical dimensions are being pushed below the 100 nm scale.

Scaling the stripe widths of currently manufactured read heads estimates that a stripe width of approximately 25–35 nm is required to achieve an areal density of approximately 1 Tbits/in$^2$. Scaling past reader stripe height designs for previous products (e.g., current-in-plane spin-valve sensors) estimates that a stripe height of approximately 15–30 nm is required for an areal density of approximately 1 Tbits/in$^2$. Manufacturing a read sensor along the anticipated dimensions is a difficult task utilizing current processing technology.

The sensor width, or stripe width, is currently defined via lithography (DUV, e-beam, etc.) and etching (Ar ion milling, reactive ion beam etching, reactive ion etching, etc.). Now that the data storage industry is passing the semiconductor industry in the minimum critical dimensions needed for read and write sensors, it is becoming more difficult to shrink the width and height of the sensors and control the variation of sensor width and height from sensor-to-sensor and wafer-to-wafer. Once a sensor is etched, there is currently no way of reworking, adjusting or tuning the sensor, or stripe, width. Additionally, the sensor height, or stripe height, is typically defined using a mechanical lapping process and electronic lapping guides (ELGs) to set the stripe height. Once the sensor is lapped, there is currently no way of reworking, adjusting or tuning the sensor, or stripe, height. If the head was lapped or etched improperly, the head needs to be scrapped.

The present invention is directed towards overcoming one or more of the above-mentioned problems.

SUMMARY OF THE INVENTION

Instead of using lithography and etching to define the physical and electric/magnetic stripe width (SW), and lapping to define the physical and electric/magnetic stripe height (SH), the present invention contemplates utilizing a means for controlling the area (SW×SH) over which the current can flow through the sensor. One way contemplated by the present invention is to form a current gate between the top and/or bottom contact and the read sensor in, for example, a current-perpendicular-to-the-plane (CPP) sensor. The electrical size of the current gate is controlled by a voltage electrode dedicated to controlling the gate. The current gate size determines where the current can flow within the sensor, instead of this being determined by the physical size of the sensor. This relaxes the lithography/etching and lapping requirements, and allows for electronically adjusting the SW and/or SH, thus alleviating the need for producing sensors having an extremely small physical size in order to achieve higher areal densities.

In one form, the present invention includes a magnetic sensing structure having a stripe height and a stripe width defining an area for a current flowing therethrough, and at least one electrode positioned adjacent an edge of the magnetic sensing structure for adjustably controlling the stripe width and/or stripe height, and therefore the area (SW×SH), of the magnetic sensing structure through which the current can flow.

In a further form, the magnetic sensing structure includes top and bottom surfaces defining a path for the current flowing through the structure. Each of the top and bottom surfaces includes an area defined by SW×SH. A layer of semiconductor or semimetal material is disposed on at least one of the top and bottom surfaces of the magnetic sensing structure. At least one electrode is provided on the layer of semiconductor/semimetal material adjacent an edge of the magnetic sensing structure. Applying a voltage to the at least one electrode creates a depletion region in the layer of semiconductor/semimetal material prohibiting the flow of current therethrough, such that area (SW×SH) of the magnetic sensing structure through which current will flow is controllably adjustable by controlling the voltage applied to the at least one electrode.

Semiconductor materials that may be utilized for the material layer include, but are not limited to, silicon (Si), germanium (Ge), gallium arsenide (GaAs), indium arsenide (InAs), indium phosphide (InP), indium antimonide (InSb) and the like, and alloys thereof. Similarly, semimetal materials that may be utilized for the material layer include, but are not limited to, bismuth (Bi), antimony (Sb), arsenic (As) and the like, and alloys thereof.

In another form, the layer of semiconductor/semimetal material is provided on both the top and bottom surfaces of the magnetic sensing structure. First and second electrodes are disposed on the top layer of semiconductor/semimetal material and positioned adjacent side surfaces of the magnetic sensing structure. Similarly, third and fourth electrodes are disposed on the bottom layer of semiconductor/semimetal material and also positioned adjacent the side surfaces of the magnetic sensing structure. In this manner, the stripe width of the magnetic sensing structure is controllably adjustable by controlling the voltage applied to the first, second, third and fourth electrodes.

In yet a further form, a fifth electrode is disposed on the top layer of semiconductor/semimetal material and positioned adjacent a back surface of the magnetic sensing structure. Similarly, a sixth electrode is provided on the bottom layer of semiconductor/semimetal material and also positioned adjacent the back surface of the magnetic sensing structure. In this manner, the stripe height of the magnetic sensing structure is controllably adjustable by controlling the voltage applied to the fifth and sixth electrodes.

The present invention thus contemplates controlling the stripe width and/or stripe height of the magnetic sensing structure at both the top and bottom surfaces thereof. However, such control may be provided only on the top surface of the magnetic sensing structure or only on the bottom surface of the magnetic sensing structure without departing from the spirit and scope of the present invention.

A method of adjustably controlling the stripe height (SH) and/or stripe width (SW) of a magnetic sensing structure is also provided according to the present invention. The strip height and strip width defining an area (SW×SH) for current flowing through the magnetic sensing structure. The inventive method generally includes the steps of providing a first layer of semiconductor or semimetal material on a surface of the magnetic sensing structure which includes the stripe height and stripe width, and providing at least one electrode on the first layer of semiconductor/semimetal material and positioned adjacent an edge of the surface of the magnetic sensing structure which includes the stripe height and stripe width. Selectively applying a voltage to the at least one electrode on the first layer selectively creates a depletion region in the first layer of semiconductor/semimetal material prohibiting the flow of current therethrough, such that the stripe height and/or stripe width of the magnetic sensing structure, depending upon the positioning of the at least one electrode, are selectively controllable by controlling the voltage applied to the at least one electrode.

In an additional form, the method further includes the steps of providing a second layer of semiconductor/semimetal material on an opposite surface of the magnetic sensing structure which also includes the stripe height and stripe width, and providing at least one electrode on the second layer of semiconductor/semimetal material and positioned adjacent an edge of the opposite surface of the magnetic sensing structure which includes the stripe height and stripe width. Selectively applying a voltage to the at least one electrode on the second layer selectively creates a depletion region in the second layer of semiconductor/semimetal material prohibiting the flow of current therethrough, such that the stripe height and/or stripe width of the magnetic sensing structure, depending upon the positing of the at least one electrode, are selectively controllable by controlling the voltage applied to the at least one electrode.

It is an aspect of the present invention to relax the lithography/etching and lapping requirements used to produce magnetic read sensors.

It is a further aspect of the present invention to adjustably control the stripe height and stripe width of magnetic read sensors.

It is an additional aspect of the present invention to electronically adjust the stripe width and/or stripe height of a magnetic read sensor.

Other aspects and advantages of the present invention can be obtained from a study of the specification, the drawings, and the appended claims.

DETAILED DESCRIPTION OF THE INVENTION

Figure 1:
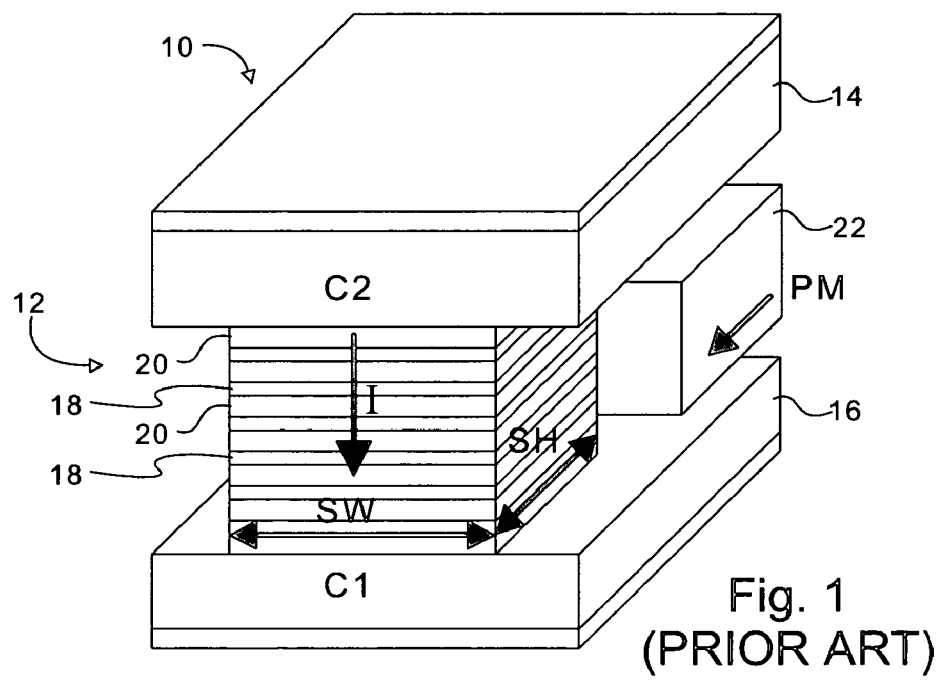
FIG. 1 is a perspective view of a prior art current-perpendicular-to-the-plane (CPP) multilayer giant magnetoresistive (GMR) magnetic reader.

FIG. 1 illustrates a perspective view of a prior art CPP (Current-Perpendicular-to-the-Plane) multilayer GMR (Giant Magnetoresistive) magnetic reader, shown generally at 10. The reader 10 includes a multilayer magnetic sensing structure 12 provided between shield layers 14 and 16 of permalloy material, such as NiFe and the like. The multilayer magnetic sensing structure 12 includes a plurality of intermixed and/or alternating layers of ferromagnetic 18 and nonmagnetic 20 materials. The layers 18 and 20 may have the same thicknesses, or may have varying thicknesses, depending upon the particular application. A permanent magnet 22 is provided behind the multilayer magnetic sensing structure 12, and is typically separated from the structure 12 and the shields 14 and 16 by a gap layer of aluminum-oxide ($Al_2O_3$) or other similar material.

The permanent magnet 22 biases the magnetization directions of the ferromagnetic layers 18, with each of the ferromagnetic layers 18 having a magnetization that is substantially rotatable. A current (I) is applied to the reader 10 in the direction shown (voltage source not shown). As the reader 10 is passed over the local magnetic domains on a magnetic recording disc (not shown), these magnetic domains cause the magnetizations of the ferromagnetic layers 18 to rotate. The rotation of the magnetization of the ferromagnetic layers 18 changes the magnetoresistance of the multilayer magnetic sensing structure 12 and, hence, the current (I) flowing therethrough. A current detector (not shown) detects the change in current caused by the changing magnetoresistance of the multilayer magnetic sensing structure 12. In this manner, the reader 10 is able to read the information stored on a recording disc.

As shown in FIG. 1, the magnetic sensing structure 12 includes a stripe height (SH) and a stripe width (SW), which define the physical size of the structure 12. The stripe height and stripe width define an area (SW×SH) of the magnetic sensing structure 12 through which the current (I) flows. As previously noted, as areal densities continue to increase and approach 1 Tbits/$in^2$, the critical dimensions of the stripe height (SH) and stripe width (SW) must be on the order of approximately 15–30 nm. Producing a magnetic sensor of this size requires pushing the limits of lithography, etching, and lapping processes. Moreover, after processing, the stripe height (SH) stripe width (SW) of the magnetic sensing structure 12 are fixed and cannot be changed. If a physically smaller or larger sensor is thereafter required, a new one must be manufactured and the old one discarded.

Further, developing an optimum stripe height (SH) and stripe width (SW) for a magnetic sensing structure is important for optimum operation of the device. If these dimensions are too large, the magnetic sensing structure will have a low sensitivity to the local magnetic domains on the magnetic recording disc. Alternately, if these dimensions are made too small, the sensor may operate in a non-linear region and may become saturated. The present invention is intended to overcome these problems by allowing the stripe height and stripe width to be electronically adjusted to optimum dimensions.

Figure 2:
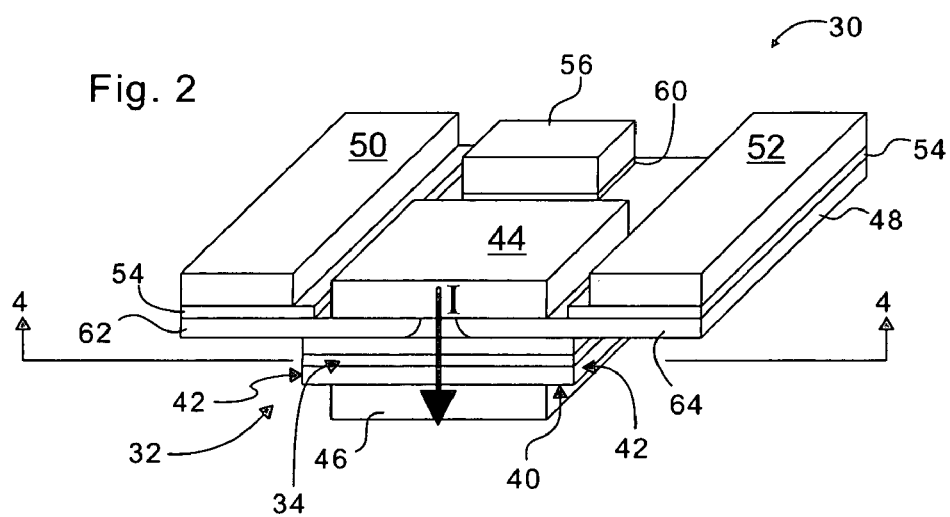
FIG. 2 is a partial perspective view of a magnetic reader with stripe height/width control according to the present invention.
Figure 3:
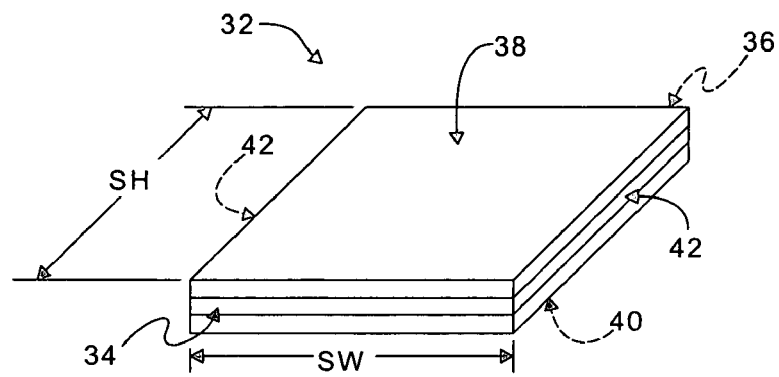
FIG. 3 is a perspective view of the magnetic sensing structure shown in FIG. 2.

FIG. 2 illustrates a magnetic read head, shown generally at 30, according to a first embodiment of the present invention. For clarity, the shield layers of permalloy material and permanent magnet layers for biasing, which may be necessary, have been omitted. The magnetic read head 30 includes a magnetic sensing structure 32 having a current (I) flowing therethrough in the direction shown. As shown more clearly in FIG. 3, the magnetic sensing structure 32 includes a front surface 34 defining an air bearing surface of the magnetic read head 30, a back surface 36, a top surface 38, a bottom surface 40, and side surfaces 42. The front 34 and back 36 surfaces define the stripe height (SH) of the magnetic sensing structure 32, while the side surfaces 42 define the stripe width (SW) of the magnetic sensing structure 32. The SW and SH of the magnetic sensing structure 32 define the area (SW×SH) through which the current (I) will flow through the magnetic sensing structure 32, while the top 38 and bottom 40 surfaces generally define the path along which the current (I) flows. Typically, the current (I) will flow through the entire area defined by the SH and SW, which also define the physical size of the magnetic sensing structure 32. In the present invention, however, the current flow is not determined by the physical size of the magnetic sensing structure 32, as will be described below.

Referring to FIG. 2, contacts 44 and 46 are provided at the top 38 and bottom 40 surfaces of the magnetic sensing structure 32 to electrically connect the magnetic sensing structure 32 to the shield layers (not shown), which are in turn connected to a voltage source (not shown) for applying of the current (I). A layer of semiconductor or semimetal material 48 is disposed on the top surface 38 of the magnetic sensing structure 32, with the contact 44 disposed on the semiconductor/semimetal material layer 48. Current gates, or electrodes, 50 and 52 are provided on the semiconductor/semimetal layer 48 for controlling the stripe width (SW) of the magnetic sensing structure 32. As shown in FIG. 2, the electrodes 50 and 52 are separated from the semiconductor/semimetal layer 48 by an insulating layer 54. The electrodes 50 and 52 are positioned adjacent the side surfaces 42 of the magnetic sensing structure 32 at the top edge thereof to control the SW. Additionally, a current gate, or electrode, 56 is also provided on the semiconductor/semimetal layer 48 for controlling the stripe height (SH) of the magnetic sensing structure 32. The electrode 56 is separated from the semiconductor/semimetal layer 48 by an insulating layer 60 and positioned adjacent the back surface 36 of the magnetic sensing structure at the top edge thereof to control the SH.

Figure 4:
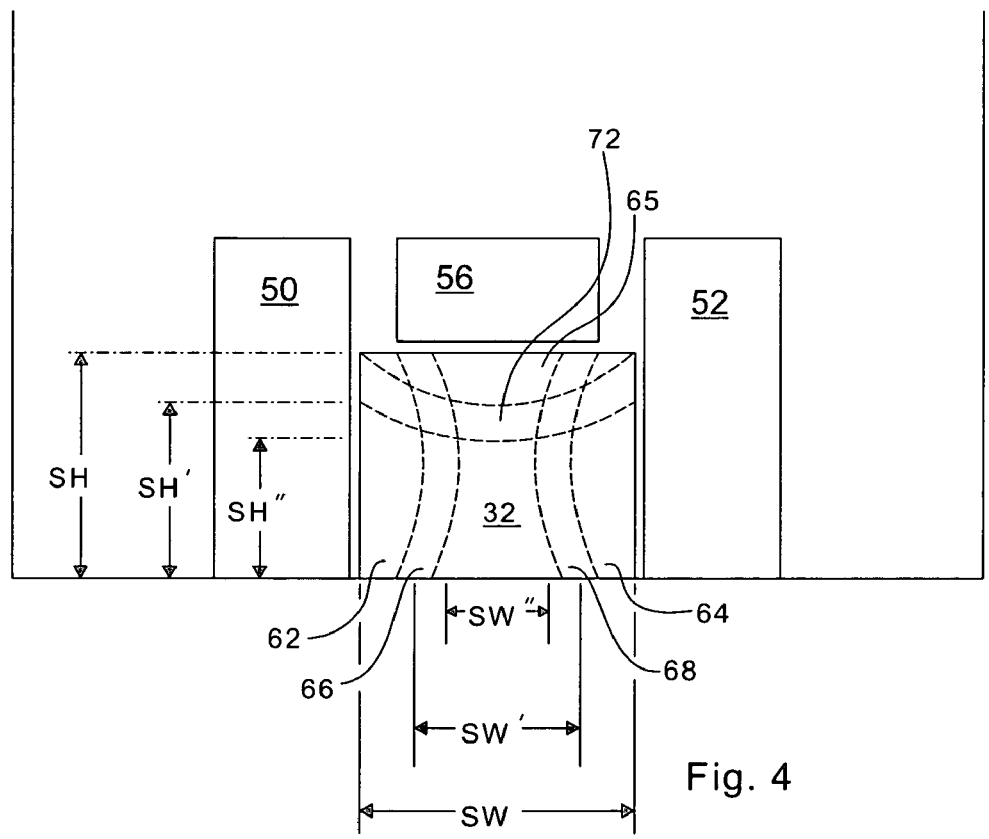
FIG. 4 is a partial cross-sectional view of the inventive magnetic reader taken along line 4—4 in FIG. 2.

Selectively applying a voltage to the electrodes 50, 52 and 56 allows the stripe height and stripe width of the magnetic sensing structure 32 to be controllably adjusted. Applying voltages to the electrodes 50, 52 and 56 will create depletion regions in the semiconductor/semimetal layer 48 underneath the respective electrode where there are no charge carriers, such as electrons or holes. The charge carriers are repelled by the voltage applied to the electrodes, and this restricts the current (I) flow to the region between the electrodes 50, 52 and 56. For example, as shown in FIGS. 2 and 4, when a voltage is applied to the electrode 50, a depletion region 62 is created in the semiconductor/semimetal layer 48 in the region underneath the electrode 50. Similarly, when a voltage is applied to the electrode 52, a depletion region 64 is created in the semiconductor/semimetal layer 48 in the region underneath the electrode 52. Since no current (I) will flow in either of the depletion regions 62 and 64, applying a voltage to the electrodes 50 and 52 effectively reduces the stripe width (SW) of the magnetic sensing structure 32 to that area between the depletion regions 62 and 64. Applying a voltage to the electrode 56 creates a depletion region 65 in the semiconductor/semimetal layer 48 in the region underneath the electrode 56. Since no current (I) will flow in the depletion region 65, the stripe height (SH) of the magnetic sensing structure 32 can similarly be effectively reduced by applying a voltage to the electrode 56. Effectively reducing the stripe height (SH) and stripe width (SW) of the magnetic sensing structure 32 is more clearly shown in FIG. 4.

FIG. 4 illustrates the placement of the electrodes 50, 52 and 56 with respect to the magnetic sensing structure 32. All other elements have been removed for clarity purposes. As shown in FIG. 4, applying a voltage to the electrode 50 creates the depletion region 62 in the layer 48 as shown by the dotted lines. Similarly, applying a voltage to the electrode 52 creates the depletion region 64 in the layer 48 also as shown by the dotted lines. Thus, by applying a voltage to the electrodes 50 and 52 the stripe width (SW) of the magnetic sensing structure 32 can be reduced to an effective stripe width (SW'). Increasing the voltage applied to the electrodes 50 and 52 will increase the depletion regions to include regions 66 and 68, respectively, to further develop an even smaller effective stripe width (SW") for the magnetic sensing structure 32. In this manner, by adjusting the voltage applied to the electrodes 50 and 52, the effective stripe width of the magnetic sensing structure 32 can be adjusted without having to physically adjust the size of the structure 32.

In addition to adjusting the size of the stripe width of the magnetic sensing structure 32, the location of the stripe width, i.e., the effective sensor location, can also be moved within the structure 32 in accordance with the present invention. FIG. 4 illustrates essentially applying the same voltages to the electrodes 50 and 52 to reduce the effective stripe width. By applying different voltages to the electrodes 50 and 52, the location of the effective stripe width can be moved relative to either the media or the slider. This would allow the present invention to be used for high speed tracking in addition to the stripe width and stripe height control.

For example, and referring to FIG. 4, by increasing the voltage applied to the electrode 50 and decreasing the voltage applied to the electrode 52, the effective stripe width (SW' or SW") can be moved to the right, effectively moving the sensor to the right. Similarly, by decreasing the voltage applied to the electrode 50 and increasing the voltage applied to the electrode 52, the effective stripe width (SW' or SW") can be moved to the left, effectively moving the sensor to the left. Thus, by controlling the voltages applied to the electrodes 50 and 52, the location of the stripe width can be adjustably controlled without having to physically move the structure 32. This electrical actuation for changing sensor location is much faster than conventional mechanical actuation means that are currently used. The only constraint of course is that the effective stripe width cannot be moved beyond the physical boundaries of the magnetic sensing structure 32.

In the same manner as described above, the stripe height (SH) of the magnetic sensing structure 32 can be adjusted by applying a voltage to the electrode 56. Applying a voltage to the electrode 56 creates the depletion region 65 in the layer 48 shown by the dotted lines. Thus, by applying a voltage to the electrode 56 the stripe height (SH) of the magnetic sensing structure 32 can be reduced to an effective stripe height (SH'). Increasing the voltage applied to the electrode 56 increases the depletion region to include the region 72, and further reduces the effective stripe height (SH") of the magnetic sensing structure 32. In this manner, by adjusting the voltage applied to the electrode 56, the stripe height of the magnetic sensing structure 32 can be adjusted without having to physically alter the size of the structure 32.

The present invention allows the sensor 32 dimensions to be much larger than current lithographic capabilities since this will not define the final electrical/magnetic stripe height and/or stripe width. For example, effective stripe heights and widths of approximately 15–30 nm could be achieved utilizing a magnetic sensing structure having a stripe height and/or width on the order of 1 micron and above. The manufacture of read and write sensors having critical dimensions on the order of 1 micron and above is easier than manufacturing a sensor having critical dimensions on the order of 15–30 nm and accordingly, the present invention may help in reducing manufacturing costs. While the electrodes 50, 52 and 56 are illustrated as positioned adjacent the edges the magnetic sensing structure 32, they may overlap the magnetic sensing structure 32 somewhat and still be considered adjacent since their placement is not critical and does not directly determine the stripe height or stripe width. As the electrode separation is increased, however, for a given or desired stripe width (SW) or stripe height (SH), a larger voltage will simply need to be applied. While the current (I) will disperse somewhat through the magnetic sensing structure 32 after passing through the semiconductor/semimetal layer 48, such current (I) dispersion should be minimal and should not affect operation of the read head 30. However, if a more restrictive current (I) flow is desired, the present invention contemplates providing electrodes on the bottom surface 40 of the magnetic sensing structure as well.

Figure 5:
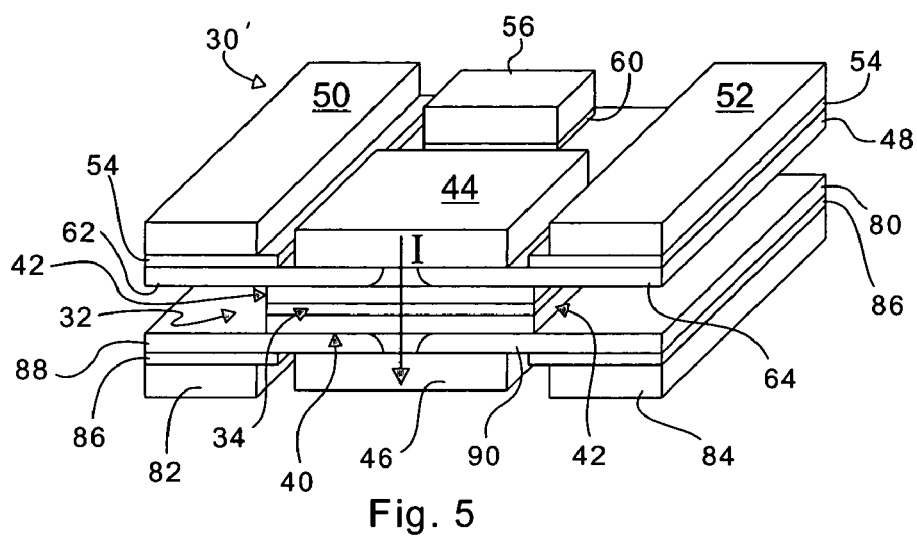
FIG. 5 is a partial perspective view of the inventive magnetic reader according to an alternate embodiment of the present invention.

As shown in FIG. 5, electrodes may also be provided on the bottom surface 40 of the magnetic sensing structure 32 to further control the stripe height (SH) and stripe width (SW) of the magnetic sensing structure 32. The magnetic read head 30' shown in FIG. 5 includes a semiconductor/semimetal layer 80 provided on the bottom surface 40 of the magnetic sensing structure 32. Electrodes 82 and 84 are provided on the semiconductor/semimetal layer 80 and separated therefrom by an insulating layer 86. The electrodes 82 and 84 are positioned adjacent the side surfaces 42 of the magnetic sensing structure 32 at the bottom edge thereof for further controlling the stripe width (SW) of the magnetic sensing structure 32. As voltages are applied to the electrodes 82 and 84, depletion regions 88 and 90 are created in the semiconductor/semimetal layer 80, respectively. The depletion regions 88 and 90 will not allow current to flow therethrough and will further restrict the stripe width (SW) of the magnetic sensing structure 32 to that area between the depletion regions 88 and 90. While a minimal amount of current (I) may stray toward the side surfaces 42 of the magnetic sensing structure 32, by applying the electrodes 82 and 84 on the bottom surface 40, any current (I) that may have strayed will be confined to that area between the depletion ranges 88 and 90 as the current (I) exits the magnetic sensing structure 32. The depletion regions 62, 64 and 88, 90 in the top 48 and bottom 80 layers, respectively, can be aligned by changing the voltages applied to the electrodes 50, 52, 82 and 84. This would be done by adjusting the applied voltages to optimize the signal-to-noise ratio and/or bit error rate in the readback signal from the read head. Since the information previously written to the disc drive memory, for example, is known, the bit error rate can be determined by reading back the information stored therein and determining the error rate in the readback signal.

While not able to be seen in FIG. 5, an electrode may be positioned on the semiconductor/semimetal layer 80 adjacent the back surface 36 of the magnetic sensing structure 32 at the bottom edge thereof to further control the stripe height (SH) of the magnetic sensing structure 32 at the bottom surface 40 thereof in a similar manner as previously described with respect to the electrode 56. The bottom, stripe height control electrode (not shown) will confine any current (I) that may have strayed to that area between its respective depletion region (not shown) and the front surface 34 (air bearing surface) of the magnetic sensing structure 32.

Figure 6:
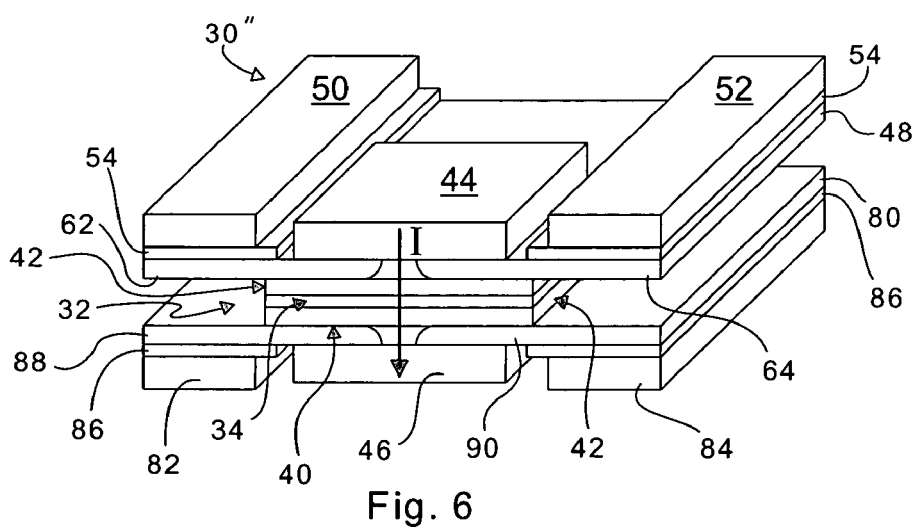
FIG. 6 is a partial perspective view of the inventive magnetic reader according to a further embodiment of the present invention.

As shown in the magnetic read head 30" of FIG. 6, if it is desired that only the stripe width of the magnetic sensing structure 32 be controlled, the electrode 56 and the bottom stripe height control electrode adjacent the back surface 36 of the magnetic sensing structure 32 may be omitted. As shown in FIG. 6, only the stripe width (SW) of the magnetic sensing structure 32 is controlled to that area between the depletion regions 62, 64, 88 and 90, and the stripe height (SH) of the magnetic sensing structure 32 is defined by its physical height. Alternatively, if only the stripe height (SH) is desired to be controlled, the electrode 56 and the bottom, stripe height control electrode would be included and the stripe width control electrodes 50, 52, 82 and 84 would be omitted.

As illustrated and described herein, the various electrodes set forth herein could be used for only stripe width control, only stripe height control, or both stripe width and stripe height control. Additionally, the electrodes could be placed above, below, or both above and below, the magnetic sensing structure 32. The present invention allows the sensor physical dimensions to be much larger than required for reading and recording at higher areal bit densities, as the stripe width (SW) and stripe height (SH) are electrically controlled. The alignment between the back of the sensor and the lapping guides is not critical since the stripe height is electronically adjustable. Further, since the current (I) will be directed to, and flow in, the central area of the magnetic sensing structure 32, magnetic effects such as edge effects, Bartthausen noise and hysteresis, that degrade sensor performance are reduced Some of the semiconductor materials contemplated for the layers 48 and 80 include, but are not limited to, silicon (Si), germanium (Ge), gallium arsenide (GaAs), indium arsenide (InAs), indium phosphide (InP), indium antimonide (InSb) and the like, and alloys thereof. Further, and as described herein, some of the semimetal materials contemplated for the layers 48 and 80 may include but are not limited to, semimetals such as bismuth (Bi), antimony (Sb), arsenic (As) and the like, and alloys thereof. Semimetals, such as Bi, Sb, and As, where the valence and conduction bands overlap slightly also have very high mobilities ($\mu_e$).

If the $\mu_e$ is calculated for Bi using bulk parameters, it is larger than that measured for the best narrow bandgap semiconductors. Using $\mu=1/(\rho\, e\, n)$, where $\rho$ is the resistivity, e is the electron charge and n is the electron carrier density, one can calculate $\mu_e$. Using $\rho=116\mu\text{Ohm-cm}$ and $n=2.88e^{17}$ cm$^{-3}$ for Bi, one calculates $\mu_e(\text{Bi})=18.7\text{m}^2/\text{V/sec}$. Sb, on the other hand, has a maximum $\mu_e=7\text{ m}^2/\text{V/sec}$. This high of a mobility has not yet been realized for Bi, but part of this reason may be that the measurements are for macroscopic samples. For the sensor device sizes that are contemplated herein (<100 nm), the device size can be made smaller than the grain size. This may make the effective mobility for the electron within the device much higher than that measured in a macroscopic test structure where the electron encounters many grain boundaries. Annealing Bi and/or choosing good seedlayer materials may easily result in grains larger than 100 nm. Due to the low melting point of Bi, anneal temperatures do not need to be large in order to increase the grain size significantly (<300° C.). In addition, alloying the Bi with other materials to expand or contract the lattice may result in an increased mobility, similar to adding Ge to Si to increase the mobility of the Si. Having a high mobility metal that can be sputtered, instead of an MBE or MOCVD grown quantum well, makes the inventive structure much more realizable. Using a low resistively and/or low bandgap, high mobility material will also help to reduce the stray resistance from the semiconductor/semimetal material. This stray resistance could be from a Schottky barrier forming between the semiconductor/semimetal material and the contacts, and/or between the semiconductor/semimetal material and the magnetic sensing structure. Alternately, the stray resistance could be from the resistance of the semiconductor/semimetal material itself, which is calculated according to the formula $R=\rho l/A$, where "$\rho$" is the resistively of the material, "l" is the length of the material, and "A" is the cross-sectional area of the material.

The present invention provides a novel approach to controllably adjusting both the size and location of the stripe width and height of magnetic sensing structures without having to physically adjust the size and/or location of the magnetic sensing structure. While the present invention has been described with particular reference to the drawings, it should be understood that various modifications could be made without departing from the spirit and scope of the present invention. For example, while the inventive stripe height and/or stripe width controlling structure of the present invention has been illustrated and described herein as used in connection with a CPP sensor structure, the inventive structure may be utilized with other types of sensors, such as, but not limited to, current-in-plane (CIP), giant magnetoresistive (GMR) multilayer, spin-valve and tunnel junction sensors, without departing from the spirit and scope of the present invention.

I claim:

1. A device comprising:
   a magnetic sensing structure having a stripe height and a stripe width defining an area for a current flowing therethrough; and
   at least one electrode positioned adjacent an edge of the magnetic sensing structure for actively adjustably controlling the area of the magnetic sensing structure through which the current can flow.

2. The device of claim 1, wherein the magnetic sensing structure includes top and bottom surfaces defining a path for the current flowing therethrough, the device further comprising a layer of material selected from the group consisting of semiconductors and semimetals disposed on at least one of the top and bottom surfaces of the magnetic sensing structure, wherein the at least one electrode is provided on the layer of semiconductor/semimetal material adjacent an edge of magnetic sensing structure.

3. The device of claim 2, wherein applying the voltage to the at least one electrode creates a depletion region in the layer of semiconductor/semimetal material prohibiting the flow of current therethrough such that the area of the magnetic sensing structure through which current will flow is controllably adjustable by controlling the voltage applied to the at least one electrode.

4. The device of claim 2, wherein if the semiconductor/semimetal material comprises a semimetal, the semimetal is selected from the group consisting of Bi, Sb, As, and alloys thereof, and
   wherein if the semiconductor/semimetal material comprises a semiconductor, the semiconductor is selected from the group consisting of Si, Ge, GaAs, InAs, InP, InSb, and alloys thereof.

5. The device of claim 1, wherein the device is included in a sensor selected from the group consisting of CPP, CIP, GMR multilayer, spin-valve and tunnel junction sensors.

6. A device comprising:
   a magnetic sensing structure having front, back, top, bottom and side surfaces, the front and back surfaces defining a stripe height of the magnetic sensing structure and the side surfaces defining a stripe width of the magnetic sensing structure, the stripe height and stripe width defining an area for a current flowing through the magnetic sensing structure along a path defined by the top and bottom surfaces;
   a layer of material selected from the group consisting of semiconductors and semimetals provided on at least one of the top and bottom surfaces of the magnetic sensing structure; and
   at least one electrode disposed on the layer of semiconductor/semimetal material and positioned adjacent at least one of the back and side surfaces of the magnetic sensing structure,
   wherein a voltage applied to the at least one electrode creates a depletion region in the layer of semiconductor/semimetal material prohibiting the flow of current therethrough such that the area of the magnetic sensing structure through which current will flow is controllably adjustable.

7. The device of claim 6, wherein as the voltage applied to the at least one electrode increases the depletion region in the layer of semiconductor/semimetal material increases such that the area of the magnetic sensing structure through which current will flow decreases.

8. The device of claim 6, wherein if the semiconductor/semimetal material comprises a semimetal, the semimetal is selected from the group consisting of Bi, Sb, As, and alloys thereof, and
   wherein if the semiconductor/semimetal material comprises a semiconductor, the semiconductor is selected from the group consisting of Si, Ge, GaAs, InAs, InP, InSb, and alloys thereof.

9. The device of claim 6, wherein the layer of semiconductor/semimetal material comprises a first layer of semiconductor/semimetal material provided on the top surface of the magnetic sensing structure, and wherein the at least one electrode comprises first and second electrodes disposed on the first layer of semiconductor/semimetal material and positioned adjacent the side surfaces of the magnetic sensing structure such that the stripe width of the magnetic sensing structure is controllably adjustable by controlling the voltage applied to the first and second electrodes.

10. The device of claim 9, wherein the layer of semiconductor/semimetal material further comprises a second layer of semiconductor/semimetal material provided on the bottom surface of the magnetic sensing structure, and wherein the at least one electrode further comprises third and fourth electrodes disposed on the second layer of semiconductor/semimetal material and positioned adjacent the side surfaces of the magnetic sensing structure such that the stripe width of the magnetic sensing structure is further controllably adjustable by controlling the voltage applied to the third and fourth electrodes.

11. The device of claim 6, wherein the layer of semiconductor/semimetal material comprises a first layer of semiconductor/semimetal material provided on the top surface of the magnetic sensing structure, and wherein the at least one electrode comprises a first electrode disposed on the first layer of semiconductor/semimetal material and positioned adjacent the back surface of the magnetic sensing structure such that the stripe height of the magnetic sensing structure is controllably adjustable by controlling the voltage applied to the first electrode.

12. The device of claim 11, wherein the layer of semiconductor/semimetal material further comprises a second layer of semiconductor/semimetal material provided on the bottom surface of the magnetic sensing structure, and wherein the at least one electrode further comprises a second electrode disposed on the second layer of semiconductor/semimetal material and positioned adjacent the back surface of the magnetic sensing structure such that the stripe height of the magnetic sensing structure is further controllably adjustable by controlling the voltage applied to the second electrode.

13. The device of claim 6, wherein the device is included in a sensor selected from the group consisting of CPP, CIP, GMR multilayer, spin-valve and tunnel junction sensors.

14. A magnetic reader including a magnetic sensing structure having a stripe height and a stripe width defining an area for a current flowing therethrough, the magnetic reader comprising:
 a layer of material selected from the group consisting of semiconductors and semimetals provided on a surface of the magnetic sensing structure along a plane generally parallel to a plane of the area defined by the stripe height and stripe width of the magnetic sensing structure; and
 at least one electrode disposed on the layer of semiconductor/semimetal material and positioned adjacent an edge of the magnetic sensing structure,
 wherein a voltage applied to the at least one electrode creates a depletion region in the layer of semiconductor/semimetal material prohibiting the flow of current therethrough such that the area of the magnetic sensing structure through which current will flow is controllably adjustable.

15. The magnetic reader of claim 14, wherein if the semiconductor/semimetal material comprises a semimetal, the semimetal is selected from the group consisting of Bi, Sb, As, and alloys thereof, and
 wherein if the semiconductor/semimetal material comprises a semiconductor, the semiconductor is selected from the group consisting of Si, Ge, GaAs, InAs, InP, InSb, and alloys thereof.

16. The magnetic reader of claim 14, wherein as the voltage applied to the at least one electrode increases the depletion region in the layer of semiconductor/semimetal material increases such that the area of the magnetic sensing structure through which current will flow decreases.

17. The magnetic reader of claim 14, wherein the magnetic sensing structure includes front, back, top, bottom and side surfaces, the front surface defining an air bearing surface, the front and back surfaces defining the stripe height, the side surfaces defining the stripe width, and the top and bottom surfaces defining a path for the current flow, wherein the layer of semiconductor/semimetal material comprises a first layer of semiconductor/semimetal material provided on the top surface of the magnetic sensing structure, and wherein the at least one electrode comprises first and second electrodes disposed on the first layer of semiconductor/semimetal material and positioned adjacent the side surfaces of the magnetic sensing structure such that the stripe width of the magnetic sensing structure is controllably adjustable by controlling the voltage applied to the first and second electrodes.

18. The magnetic reader of claim 17, wherein the layer of semiconductor/semimetal material further comprises a second layer of semiconductor/semimetal material provided on the bottom surface of the magnetic sensing structure, and wherein the at least one electrode further comprises third and fourth electrodes disposed on the second layer of semiconductor/semimetal material and positioned adjacent the side surfaces of the magnetic sensing structure such that the stripe width of the magnetic sensing structure is further controllably adjustable by controlling the voltage applied to the third and fourth electrodes.

19. The magnetic reader of claim 14, wherein the magnetic sensing structure includes front, back, top, bottom and side surfaces, the front surface defining an air bearing surface, the front and back surfaces defining the stripe height, the side surfaces defining the stripe width, and the top and bottom surfaces defining a path for the current flow, wherein the layer of semiconductor/semimetal material comprises a first layer of semiconductor/semimetal material provided on the top surface of the magnetic sensing structure, and wherein the at least one electrode comprises a first electrode disposed on the first layer of semiconductor/semimetal material and positioned adjacent the back surface of the magnetic sensing structure such that the stripe height of the magnetic sensing structure is controllably adjustable by controlling the voltage applied to the first electrode.

20. The magnetic reader of claim 19, wherein the layer of semiconductor/semimetal material further comprises a second layer of semiconductor/semimetal material provided on the bottom surface of the magnetic sensing structure, and wherein the at least one electrode further comprises a second electrode disposed on the second layer of semiconductor/semimetal material and positioned adjacent the back surface of the magnetic sensing structure such that the stripe height of the magnetic sensing structure is further controllably adjustable by controlling the voltage applied to the second electrode.

21. A method of adjustably controlling the stripe height and/or stripe width of a magnetic sensing structure, the strip height and stripe width defining an area for a current flowing through the magnetic sensing structure, the method comprising the steps of:
 providing a first layer of material selected from the group consisting of semiconductors and semimetals on a surface of the magnetic sensing structure which includes the stripe height and strip width;
 providing a first at least one electrode on the first layer of semiconductor/semimetal material and positioned adjacent an edge of the surface of the magnetic sensing structure which includes the strip height and stripe width; and
 selectively applying a voltage to the first at least one electrode to selectively create a depletion region in the first layer of semiconductor/semimetal material prohibiting the flow of current therethrough such that the stripe height and/or stripe width of the magnetic sensing structure are selectively controllable by controlling the voltage applied to the first at least one electrode.

22. The method of claim 21, further comprising of the steps of:
 providing a second layer of material selected from the group consisting of semiconductors and semimetals on an opposite surface of the magnetic sensing structure which also includes the stripe height and stripe width;
 providing a second at least one electrode on the second layer of semiconductor/semimetal material and positioned adjacent an edge of the opposite surface of the magnetic sensing structure which includes the stripe height and stripe width; and
 selectively applying a voltage to the second at least one electrode to selectively create a depletion region in the second layer of semiconductor/semimetal material prohibiting the flow of current therethrough such that the stripe height and/or stripe width of the magnetic sensing structure are selectively controllable by controlling the voltage applied to the second at least one electrode.

23. The method of claim 22, wherein the steps of selectively applying a voltage to the first and second at least one electrodes comprises that steps of:
   reading back known data previously written to a recording medium; and
   adjusting the applied voltages during the readback of data to maximize the signal-to-noise ratio and/or the bit error rate of the readback signal.

24. In a disc drive including a magnetic recording head having a read sensor, the read sensor comprising:
   a magnetic sensing structure having a stripe height and a stripe width defining an area for a current flowing therethrough; and
   at least one electrode positioned adjacent an edge of the magnetic sensing structure for actively adjustably controlling the area of the magnetic sensing structure through which the current can flow.

25. The read sensor of claim 24, wherein the magnetic sensing structure includes top and bottom surfaces defining a path for the current flowing therethrough, the device further comprising a layer of material selected from the group consisting of semiconductors and semimetals disposed on at least one of the top and bottom surfaces of the magnetic sensing structure, wherein the at least one electrode is provided on the layer of semiconductor/semimetal material adjacent an edge of magnetic sensing structure.

26. The read sensor of claim 25, wherein applying the voltage to the at least one electrode creates a depletion region in the layer of semiconductor/semimetal material prohibiting the flow of current therethrough such that the area of the magnetic sensing structure through which current will flow is controllably adjustable by controlling the voltage applied to the at least one electrode.

27. A device comprising:
   a magnetic sensing structure having a stripe height and a stripe width defining an area for a current flowing therethrough; and
   at least one electrode positioned adjacent an edge of the magnetic sensing structure for adjustably controlling the area of the magnetic sensing structure through which the current can flow via a voltage applied to the at least one electrode.

28. The device of claim 27, wherein the magnetic sensing structure includes top and bottom surfaces defining a path for the current flowing therethrough, the device further comprising a layer of material selected from the group consisting of semiconductors and semimetals disposed on at least one of the top and bottom surfaces of the magnetic sensing structure, wherein the at least one electrode is provided on the layer of semiconductor/semimetal material adjacent an edge of magnetic sensing structure.

29. The device of claim 28, wherein applying the voltage to the at least one electrode creates a depletion region in the layer of semiconductor/semimetal material prohibiting the flow of current therethrough such that the area of the magnetic sensing structure through which current will flow is controllably adjustable by controlling the voltage applied to the at least one electrode.

30. A device comprising:
   a magnetic sensing structure having a stripe height and a stripe width defining an area for a current flowing therethrough;
   a layer of material selected from the group consisting of semiconductors and semimetals provided on a surface of the magnetic sensing structure along a plane generally parallel to a plane of the area defined by the stripe height and stripe width of the magnetic sensing structure; and
   at least one electrode disposed on the layer of semiconductor/semimetal material and positioned adjacent an edge of the magnetic sensing structure for adjustably controlling the area of the magnetic sensing structure through which the current can flow.

31. The device of claim 30, wherein a voltage applied to the at least one electrode creates a depletion region in the layer of semiconductor/semimetal material prohibiting the flow of current therethrough such that the area of the magnetic sensing structure through which current will flow is controllably adjustable.

32. The device of claim 31, wherein as the voltage applied to the at least one electrode increases the depletion region in the layer of semiconductor/semimetal material increases such that the area of the magnetic sensing structure through which current will flow decreases.

* * * * *